Nov. 23, 1971   L. S. KOVACS   3,621,529
APPARATUS FOR MAKING BLOW-MOLDED ARTICLES
WITH FINISHED OPENINGS
Filed Dec. 5, 1969   2 Sheets-Sheet 1
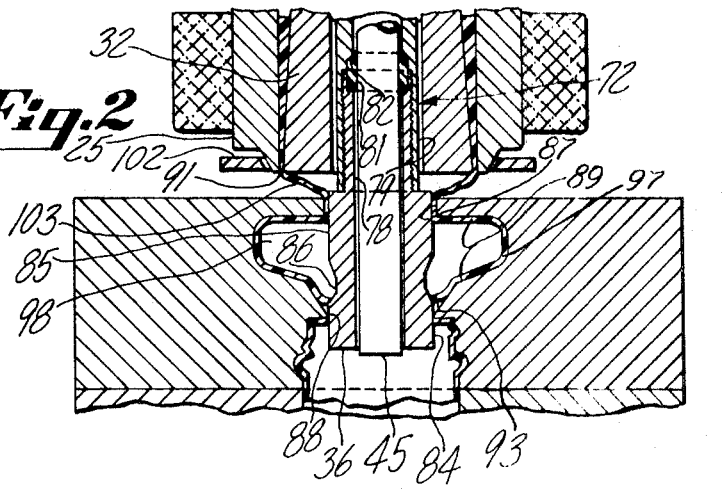
Fig. 2
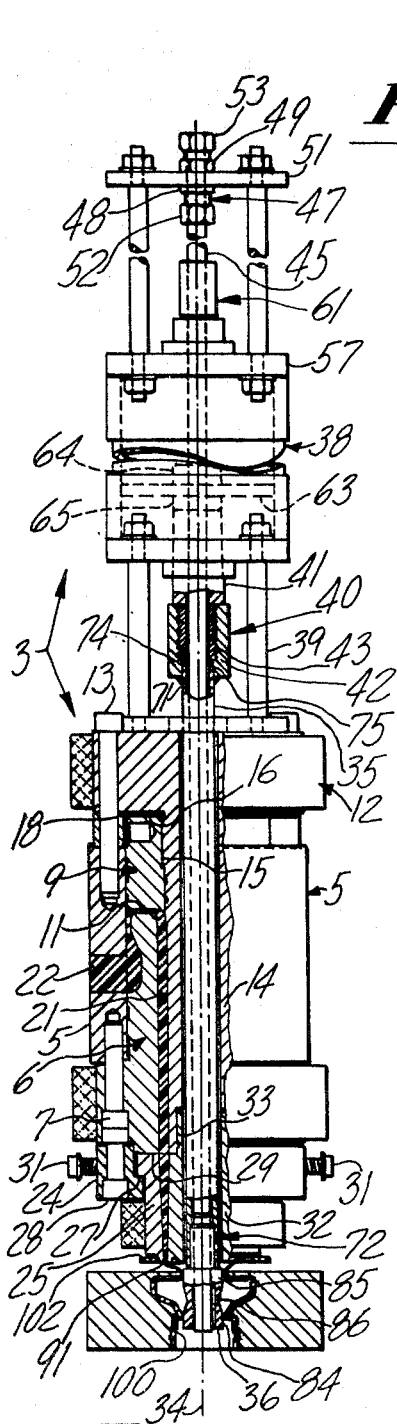
Fig. 1
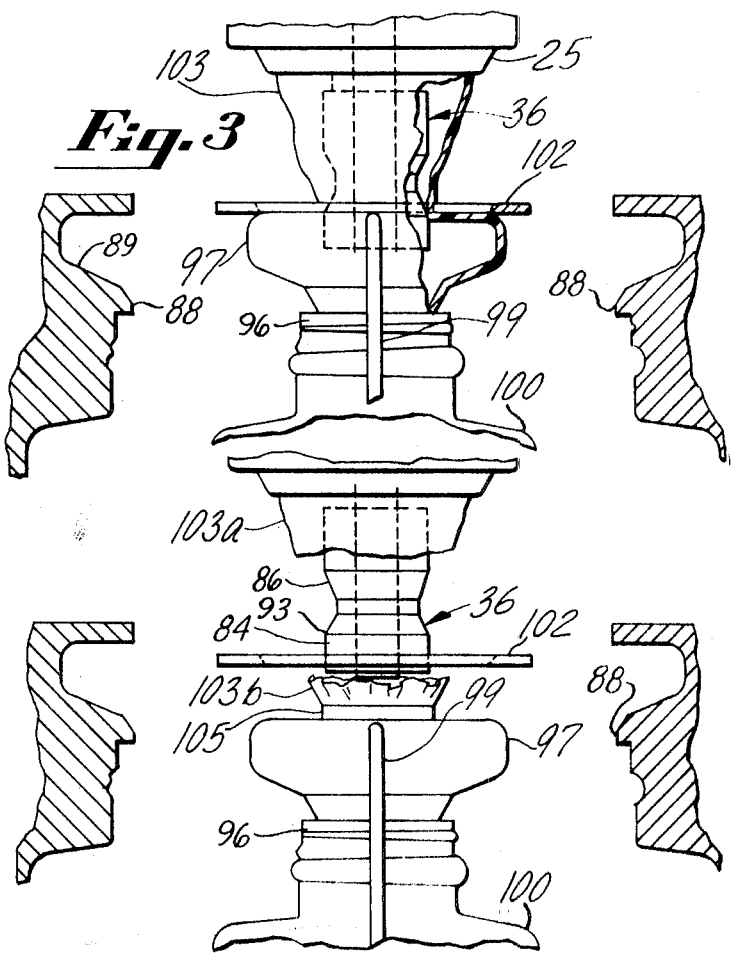
Fig. 3
Fig. 4
INVENTOR.
LLOYD KOVACS
BY
*M. Portz*
ATTORNEY

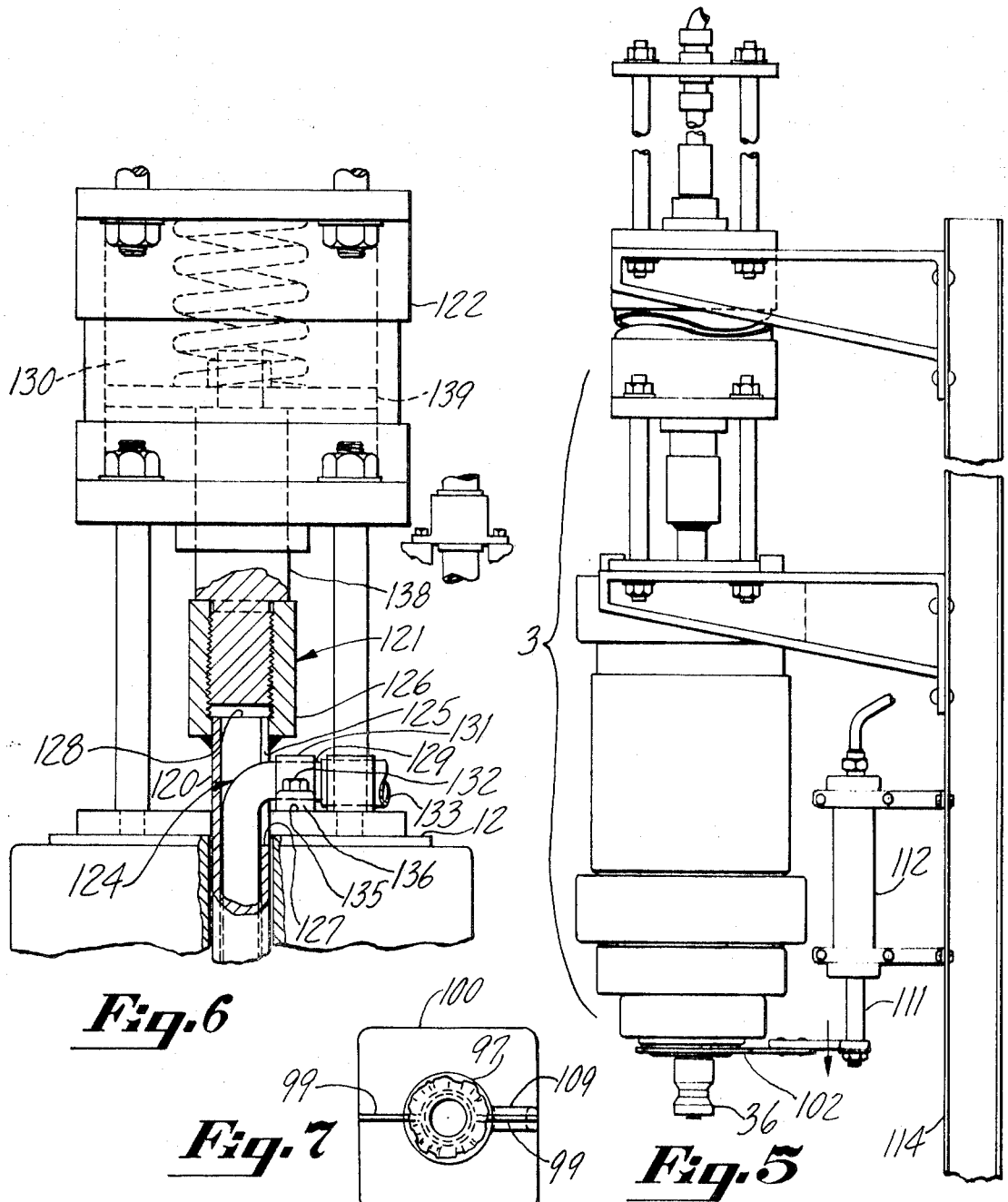

United States Patent Office 3,621,529
Patented Nov. 23, 1971

3,621,529
APPARATUS FOR MAKING BLOW-MOLDED ARTICLES WITH FINISHED OPENINGS
Lloyd Kovacs, Somerset, N.J., assignor to Midland-Ross Corporation, Cleveland, Ohio
Filed Dec. 5, 1969, Ser. No. 882,425
Int. Cl. B29d 23/03
U.S. Cl. 18—5 BS
7 Claims

ABSTRACT OF THE DISCLOSURE

Blow-molded articles are initially formed with a disposable hollow nodule severed from the neck of the container along the periphery of a finished opening at the end of the container neck. The apparatus for blow molding the container and the nodule as a unit includes a complementary mold and a trimming and sealing spool mounted on a blow pipe interiorly of a region traversed by the parison. The spool is shaped to effect sealing of the mold at the axial extremity of the unit provided by the nodule and to effect finishing of a container as the spool is traversed along the blow tube in a direction outwardly of the mold.

---

It is essential in the packaging of materials that must be sealed from the atmosphere that blow-molded containers put to this use must be capable of receiving closures which attach thereto in sealed relation therewith. A type of container with which the present invention is concerned is one that is blow molded in its entirety including portions of the neck which define an opening, and a closure of the type which effects sealed relation with the container by a portion of the closure having an outward-facing surface of cylindrical or other shape complementary to the periphery of an opening having a smooth, accurately formed periphery. Such openings are conventionally reamed or punched at a separate work station, or sheared or cut by knives or punches that use a particular configuration in machinery of greater complexity than now contemplated. Another difficulty that arises in finishing container apertures within the blow-molding station at high production rates is the attainment of sufficient cooling of the containers to avoid deformation of the container necks, or the attachment of tacky flash or parison remnants to the container.

Hence, an important object of the invention is to finish the openings of blow-molded container within the blow-molding station immediately following the instant of actually forming the container within the mold under conditions assuring very rapid production without difficulties arising out of insufficient cooling of the plastic material entering into the blow-molding operation.

Other objects ancillary and incidental to the foregoing object include: prevention of collapse and attachment of hot, tacky flash and parison remnants onto the newly molded article; production of incompletely cooled blow-molded articles having good self-supporting characteristics; provision of a blow-molding process wherein the blow-molded articles may be stripped from the blow-molding machinery at higher temperatures than customary and, hence, permitting the production of articles at high output rates; and providing apparatus and process by which stripping of the hot blow-molded articles may be freed from the molding apparatus without marking the articles.

The above and other objects are achieved in method and apparatus directed particularly to the obtaining of material cooled to a non-tacky self-supporting condition in the neck portion of a blow-molded article, e.g., a jug or bottle, preparatory to neck-finishing by shearing and separation of the flash or excess material from the finished article. The principle involved in the method entails the blow molding of a dome or other appendage of excess material to the neck portion of the article so that when such appendage is sheared in a manner to effect actual finishing of the neck opening, the material is cooled by the mold to prevent any deformation of, or damage to, the finished article.

The apparatus of the invention entails a mold for forming a major article or container-defining cavity ordinarily below a shearing ledge and a minor cavity above the ledge terminating in a seal surface defining the upper extremity of the total mold cavity. The seal surface cooperates with an upper portion of a shearing spool of special construction to confine a portion of the parison in the annular clearance between the spool and the seal surface to thus establish sealed closing of the mold during blow-molding operation. The shearing spool is of hour-glass shape and traversable along a blowtube extending therethrough. The lower portion provides a cutting shoulder at its junction with an intermediate section of less diameter, whereas the upper portion cooperates with the sealing surface of the mold. Movement of the spool in a direction outwardly or upwardly of the neck-forming portion of the mold after the blow-molding operation effects shearing as the lower spool portion moves past the ledge and the upper portion moves outwardly from the cooled blow-molded body of excess material of which at least a portion was used in establishing sealed condition of the blow-molding chamber.

In the drawing with respect to which the invention is described:

FIG. 1 is an elevation of a blow-molding die head and blowtube assembly, a blow mold, and a molded article with portions broken away and in section to illustrate internal structure;

FIG. 2 is a fragmentary diametral section along the extruding die and parison axis illustrating portions of the apparatus and the molded article during the neck-finishing operation;

FIG. 3 is a fragmentary elevation in section showing portions of the extrusion and molding apparatus at an instant when the stripping tool commences detaching the molded article from the parison connected therewith;

FIG. 4 is a fragmentary elevation of the same apparatus as FIGS. 2 and 3 illustrating the extrusion and molding apparatus at an instant slightly after severing the product from the parison has occurred;

FIG. 5 is a side elevation of the die head and blowtube assembly of FIG. 1 exposing also mechanism for detaching molded articles from the parison;

FIG. 6 is a fragmentary elevation of a modified blowtube and die head assembly showing an optional arrangement for incorporating a fixed blowtube into the assembly;

FIG. 7 is a plan view of a jug with molding flash attached thereto typifying a product of the apparatus; and FIG. 8 is a side elevation of the product shown in FIG. 7.

Proceeding now with an embodiment of the invention as illustrated in FIGS. 1–5, FIG. 1 illustrates a blowtube and die head assembly 3 and a portion of a blow mold at a condition in which blow molding has been completed but no movement of parts incidental to neck finishing have occurred. Essential components of the die head and blowtube assembly are an external die body 5, an internal die body 6 attached to the body 5 in partially telescoping relation therewith by the cap screws 7, an annular adjustable choke piece resting on an end surface 11 of the inner body 6, and a die mandrel 12 comprising a flange portion and a sleeve 14 and extending the entire length of the die head portion of the assembly. The die mandrel 12 is secured to the external die body 5 by means, such as cap screws 13. The choke piece 9 and the mandrel sleeve 14 have threaded surfaces in meshing relationship along threads 15 whereby, if the screws 13 are loosened, the choke piece 9 is rotatable about the mandrel section 14 to enable adjustment of the choke piece between surfaces 11 and 16 whereby the gap 18 between opposing ends of the external die body and the choke piece may be increased or diminished to adjust the rate of feeding plastic into the cylindrical opening 21 of the die head from the feed port 22 of the external die body 5.

A retaining ring 24 engages an annular outer die section 25 by interlocking shoulders at 27. Cap screws 28 in threaded relation with the external die body when tightened against the ring secure the outer die section 25 against an end surface 29 of the internal die body 6. Set screws 31 extend through the ring 24 for the purpose of centering the outer die section with an inner die section 32. The inner die section extends into an end portion of the mandrel sleeve 14 in telescopic threaded relation therewith at threads 33 as a mode of securement within the assembly. The die sections 25 and 32 constitute and are known as the die of the assembly 3.

As a major apparatus feature of the invention, the assembly 3 includes an elongate actuating tube 35 extending through and beyond each end of the die head just described in concentric relation with the central longitudinal axis of the blowtube and die head assembly. The essential function of the tube 35 is to support a neck-finishing spool 36 of hour-glass shape with sufficient clearance with the parison-discharging end of the die (sections 25 and 32) to permit the spool 36 to be shifted lengthwise of the axis 34 through an ambit of which, e.g., the length may be one half inch to one inch.

The tube 35 and the spool 36 fixed thereto are reciprocated by a cylinder 38 attached to an extremity of the die body assembly by four shoulder studs 39 which space the cylinder 38 with sufficient clearance with the die mandrel 12 to provide a coupling 40 joining the tube 35 and the hollow piston rod 41 of the cylinder 38. As FIG. 1 illustrates, an internally threaded sleeve 42 is welded or otherwise attached to the end of the tube 35 extending outwardly of the die mandrel to form the female portion of the coupling. This sleeve receives an externally threaded piston rod portion 43 which has a smaller diameter than that of the smooth portion of the rod received in the cylinder 38.

As a further feature of the invention, the blowtube and die head assembly includes a blowtube 45 extending the full length of the assembly in concentric relation with the axis 34. As means for fixing the position of the tube within the assembly, the tube is joined with what is known as a bulkhead union 47 having nuts 48 and 49 along its outer threaded surface which engage the lower and upper surfaces of a plate 51 through which the body of the union extends. The tube 45 is secured to the end of the bushing by a nut 52. Nut 53 permits the bushing to be connected with a compressed air source not shown. The plate 51 is supported in spaced relation with a flange 57 of the cylinder 38 to provide sufficient space for the bushing 47 and a packing gland 61 which surrounds the tube 45 and seals the cylinder 38 with respect to the outer surface of the blowtube 45.

The cylinder 38 comprises a piston 63 centrally apertured for extension of the tube 45 therethrough. As the regions of the cylinder at opposite sides of the piston must be sealed from each other, the piston comprises packing glands 64, 65 which establish a seal between the opposite end regions of the cylinder. Optionally and for more economical construction, one of such glands 64, 65 may suffice. As a preferred cylinder type, cylinder 38 may be air operated to lift the spool 36 toward the die head with spring return. The glands 64, 65 are provided preferably with packing bushings of self-lubricating material such as nylon or polytetrafluoroethylene (polymer) in contact with a highly polished external surface of the tube 45 made smooth, for example, as by plating with a hard metal such as chromium.

To prevent leakage of fluid from the cylinder 38 into the annular clearance 71 between the actuating tube 35 and the blowtube 45 in the direction of the die head, i.e., toward the spool 36, sealing may be established within either the coupling 40 or the coupling 72 wherein the trimming spool 36 is joined to the actuating tube 35. Such seals are necessarily sliding seals since the hollow piston rod 41, the tube 35 and the spool 36 reciprocate as a single unit with respect to the fixed tube 45. In establishing such seals it is worth while to obtain an extremely smooth, highly polished condition in the exterior surface of the tube 45 as by plating with metal to implement a self-lubricating seal. A seal may be established within the coupling 40 by positioning a washer 74 between the distal end surface 75 of the piston rod 41 and the shoulder surface 76 at the end of the actuating tube 35, as shown. A small clearance is provided at 77 to permit occasional tightening of the coupling for maintenance of the washer in contact with the tube 35.

As shown in FIG. 2, the spool 36 comprises a threaded sleeve 78 disposed in telescopic threaded relation with the internally-threaded end portion 79 of the tube 35. As shown, the sleeve 78 is turned into engaging compacting relation with an annular washer 81 which seats against a frusto-conical shoulder 82 defined by a counterbore of tube 35. As the spool 36 reciprocates with respect to the inner die section 32, the packing 81 slides over the outer surface of the blowtube 45.

The hour-glass shaped spool 36, as shown in FIG. 1, has two portions 84, 85 of larger diameter separated by an intermediate section 86 of smaller diameter. The portions 84, 85 are axially spaced so as to dispose portion 85 at an annular clearance with a cylindrical sealing surface 87 of the mold spaced axially from an annular ledge 88 of the mold disposed further axially inwardly of the mold. The ledge and the sealing surface 87 are spaced by a surface 89 of the mold of larger perimeter about the parison or mold axis than either the ledge or the sealing surface 87. The spool portion 85 and the surface 87 define a clearance equal to or slightly smaller than the thickness of the parison extruded from the annular clearance 91 between the outer die section and the inner die section. When a portion of the parison is confined along the full circumference of surface 87, a seal is established which is adequate to maintain the pressure conditions within the mold required for blow molding. During blow molding, the spool section 86 is maintained sufficiently downwardly from the seal surface 87 to maintain a clearance with the ledge 88 and any blow-molded material disposed thereover and to dispose the larger diameter portion 84 below said ledge. The outer surface of portion 84 is of the same diameter as the minimum diameter of the ledge or, stated another way, portion 84 and the ledge 88 have matching peripheries.

Hence, as the spool 36 moves from the position of FIG. 1 to the position of FIG. 2, a shoulder 93 along which portion 84 and section 86 join, moves into registry with the ledge 88 to shear the layer of blow-molded plastic material 94 overlying the ledge. The mold surface 89 increases in circumference outwardly in an axial direction toward the neck end of the mold to allow room for receiving the plastic material displaced by the shoulder 93 in passing through the ledge 88.

Although the shearing or severing operation, as illustrated by FIG. 2, forms a finished opening within the neck 96 of the container 100, a blow-molded nodule or dome 97 formed within a minor cavity 98 of the mold remains attached to the container 100 by flash 99. At this stage, the flash remains attached to the dome and the container by an extremely thin film along the "pinch" line produced along the exterior surface of the nodule and the container by conventional mold structure, i.e., the pinch ridges which conventionally outline the molding cavity of each mold half.

FIGS. 3 and 4 show the mold halves parted and ejection of the molded container 100 with attached dome 97 in progress. In FIG. 3 a stripper plate 102 has moved out of its position in radial proximity with the tapered portion of the outer die section 25 into engagement with flash 99 at opposite sides of the molded product. The flash ordinarily extends slightly axially outwardly from the top of the dome but, if it remains yielding due to a lack of sufficient cooling, the stripping plate settles against the upper surface of the dome 97 and continues the separation of the molded product from the parison 103 projecting from the die. In FIG. 3, the parison is shown in a stretched unbroken condition and approaching the broken or severed condition of FIG. 4 wherein a portion 103a of the parison remains connected with the die and another fragment 103b remains connected with the dome 97.

It is to be noted from FIGS. 2, 3 and 4 that the combined container and dome product removed from the mold preferably permits easy passage over the spool 36 and its movement away from the die during the stripping operation. Such passage is facilitated by constructing the spool portion 85 to a circumference or periphery that is at least as great and preferably greater than that of the shearing portion 84 in order that portion 84 may pass through the axially outer extremity of the dome, i.e., a collar 105 having been shaped internally by spool portion 85. FIG. 4 depicts the molded product in an instant of free fall whereafter the product is subjected to a deflashing operation wherein the flash 99, the dome 97 and the parison remnant 103b are removed as a single piece. During this deflashing operation, a tab bottom 107 and a flash element 108 enclosed by a handle 109 of the finished container are also removed.

FIG. 5 illustrates the apparatus of FIG. 1 in side view to generally illustrate an arrangement for supporting the apparatus, and especially actuating mechanism for the stripper plate 102. As shown, the stripper plate is traversed in the direction of the arrow by the piston rod 111 of a pneumatic spring-return air cylinder 112 supported on, e.g., a post 114 providing support for the die head and blowtube assembly 3.

FIG. 6 illustrates a modification of the apparatus shown in FIGS. 1 and 5 directed essentially to a different arrangement for incorporating a blowtube in fixed position within an actuating tube 120. The arrangement now described eliminates the necessity for extension of the blowtube through the coupling 121 and the trimming-spool actuator cylinder 122. It further eliminates the need for structure shown in FIG. 1, such as the blowtube supporting plate 51, the packing gland 61 and the shoulder studs which support the plate 51 in spaced relation with the cylinder flange 57. In other respects the structure of the die head and blowtube assembly of FIG. 6 may be identical commencing with the top surface of the die mandrel 12 and proceeding axially to the end of the blowtube and trimming spool 36.

The above-indicated changes of structure are made possible by a modified blowtube 124 which extends outwardly through the wall of the top or end portion of the tube 120 adjacent its juncture with a sleeve 126 partially forming the coupling 121. Because of the necessity for inserting the blowtube 124 into the actuating tube 120 before the sleeve 126 is welded to the tube 120, the slot 125 extends from its lower terminus at 127 to the end surface 128 of the smaller elongate cylindrical portion of the actuating tube 120. The terminus 127 is located at a sufficient distance from the laterally-extending portion 129 of the tube 124 to permit the actuating tube 120 to reciprocate the shearing spool 36 in neck-trimming strokes without any possibility of the angled portion of the blowtube engaging the end of the slot.

The tube 124 is maintained in fixed relation with the die head 12 and other non-moving parts by a U-shaped clip 131 secured by cap screws 132 on opposite sides of the tube portion 129 to the upper surface of the die mandrel. So that a flexible tube 133 may be attached to the blowtube as an air pressure source, the clip 131 and tube portion 129 are spaced above surface 135 by a shim 136.

The cylinder 122, because of the elimination of a blowtube portion extending therethrough as disclosed with respect to FIG. 1, may be of simple conventional design utilizing a solid piston rod 138 secured in the usual fashion to a spring-returned piston 139.

The foregoing description describes apparatus by which blowmolded articles, particularly bottles, jugs and other necked containers, may be molded and provided practically simultaneously with finished neck apertures before being discharged from respective blow molds.

The present method and apparatus assure that the article may be provided with a finished neck aperture when the material defining the aperture is in a sufficiently cooled state as to be protected from deformation during a subsequent operation. This is accomplished by molding the article in a manner to obtain a cooled self-supporting body, such as the dome 97, attached by the flash 99 to the body of the container 100 before the mold is opened, and finishing or forming the neck aperture while the molded article is still within the closed mold. The dome 97 is exemplary of any minor body of molded material, including bodies of much smaller configuration, which project outwardly from the neck opening in progressively expanding circumference. The purpose of the expanding circumference is to provide space into which severed material incidental to neck-finishing may be received and to provide space for withdrawal of the finishing spool without binding with the excess material. Such body of excess material in combination with the flash 99 supports a soft tacky material such as the parison fragment 103b in the clear of the container neck so that accidental contact of any such tacky material with the neck does not occur and the neck opening is protected until a deflashing operation is performed. By that time, all plastic material associated with the freshly molded article is cooled to relatively rigid non-tacky condition. After deflashing, the precisely-finished opening is exposed and in a condition suitable for receiving a precisely-shaped closure to establish a fluid tight seal.

I claim:

1. Apparatus for blow molding a container having a neck defining an opening for the container comprising:
   extruding means for forming a parison which is discharged generally along an axis extending from the extruding means;
   a mold comprising mold halves mounted for moving toward and away from an engaged position enclosing a portion of said axis;
   said mold, when closed, defining and disposing along said axis in the order named a major container-defining cavity including a neck portion;
   said mold having constricted wall means at the extremity of said cavity defining a circuitous ledge overhanging the interior of the cavity and forming an opening conforming to said container neck opening;
   said mold being radially outwardly relieved at said ledge in a direction toward the extruding means;
   a hollow blowtube supported concentrically with said axis by said extruding means, disposing the tube inwardly of said mold during a molding operation;
   a neck-trimming spool surrounding said tube at clearance therewith, said spool having one portion of which the periphery thereof substantially mates that of the opening defined by said ledge, and another portion nearer the extruding means joining with said one portion at reduced cross section to define a shearing shoulder cooperable with said ledge for shearing plastic material; and means for supporting and moving the spool relative to said tube lengthwise thereof;

said mold having a seal surface surrounding said axis and disposed nearer said extruding means than the ledge in closely-spaced peripherally - conforming relation with said other spool portion at blow-molding position to confine a continuous parison portion therebetween to establish a seal;

said mold surface cooperating with said other spool portion having a periphery permitting movement of said first portion through said seal surface outwardly of the mold.

2. Apparatus for blow molding a container having a neck defining an opening for the container comprising:

extruding means for forming a parison which is discharged generally along an axis extending from the extruding means;

a mold comprising mold halves mounted for moving toward and away from an engaged position enclosing a portion of said axis;

said mold, when closed, defining and disposing along said axis in the order named, a major container-defining cavity including a neck portion, and a seal surface surrounding said axis and spaced from said neck portion toward the extruding means;

said mold having constricted wall means at the extremity of the neck portion defining a circuitous ledge adapted for forming a continuous lip and assisting in forming said neck opening therein about said axis, said seal surface of the mold ending in a terminal opening for the mold of the same or slightly larger size than the mold opening defined by said ledge;

a hollow blowtube supported concentrically by said axis by said extruding means disposing a tube inwardly of said mold during a molding operation;

a neck-trimming spool surrounding said tube at clearance therewith, said spool having first and second spaced portions of greater cross section than an intermediate section disposed therebetween;

means for supporting and moving the spool relative to said tube lengthwise thereof;

said spool being of a length disposing the first spool portion within said seal surface when said intermediate section occupies said ledge opening and the second spool portion extends into said major cavity;

the periphery of the first spool portion being slightly smaller than the periphery of said seal surface to enable the seal surface, said first mold portion, and a continuous parison portion confined therebetween to establish a seal;

said other spool portion having a periphery substantially mating that of said ledge opening for the purpose of moving therethrough to sever a thin-walled material extending over said ledge.

3. Apparatus for blow molding a container having a neck defining an opening for the container comprising:

extruding means for forming a parison which is discharged generally along an axis extending from the extruding means;

a mold comprising mold halves mounted for moving toward and away from an engaged position enclosing a portion of said axis;

said mold, when closed, defining and disposing along said axis in the order named, a major container-defining cavity including a neck portion, and a minor cavity contiguous with said neck portion located nearer to the extruding means than the neck portion for forming a disposable nodule contiguous with the container neck portion;

said mold having constricted wall means at the junction of the minor cavity and a neck portion defining a circuitous ledge overhanging the interior of the major cavity and forming an opening conforming to said container neck opening;

said mold further defining a terminal opening to said minor cavity of similar shape and of slightly larger size than the opening formed by said ledge;

a hollow blowtube and means for supporting the blowtube in fixed relation with said extruding means and in concentric relation with said axis, said tube-supporting means disposing the tube inwardly of said mold during a molding operation;

a neck-trimming spool surrounding said tube at clearance therewith, said spool having first and second spaced portions of greater cross section than an intermediate section disposed therebetween;

means for supporting and moving the spool lengthwise along said tube;

said spool being of a length disposing the first spool portion within said terminal opening when said intermediate section occupies said ledge opening and the second spool portion is disposed within said major cavity;

the periphery of the first spool portion being slightly smaller than the periphery of said terminal opening to enable surfaces of the spool and the mold which form said peripheries, and a continuous parison portion confined therebetween to establish a seal;

the second spool portion having a periphery substantially mating that of said ledge opening for the purpose of moving therethrough to sever a thin-walled material extending over said ledge.

4. The apparatus of claim 3 wherein:

the periphery of the second spool portion is smaller than that of the first spool portion and the periphery of said ledge opening is correspondingly smaller to enable effective formation of said neck opening and to permit free passage of the second spool portion through said dome.

5. The apparatus of claim 3 comprising:

a stripping tool having an inoperative position adjacent said extruding means in the clear of said mold and said parison, and an operative position spaced lengthwise along said parison axis in the direction of parison travel from said inoperative position; and means for supporting the tool at said positions and traversing the tool with respect thereto;

said tool having portions in a plane generally perpendicular to said axis and spaced at opposite sides thereof to engage said module.

6. The apparatus of claim 3 wherein:

the components named, except for said blowtube, are arranged along a central longitudinal axis and define a passageway concentric thereto which receives said blowtube;

said extruding means comprises a die head for discharging said parison at one axial end thereof;

said means for supporting and moving the spool in an assembly comprising in operably-connected relationship an annular fluid cylinder, an annular piston, a hollow piston rod, and an actuator tube carrying said spool operably connected for traversing said spool and means for sealing the assembly in sliding relation with the blowtube against loss of fluid from said cylinder, said fluid cylinder being fixed to said die head at its other axial end;

said means for supporting the blowtube comprising means disposed in said apparatus beyond the axial end of said cylinder facing away from said die head for fixing the axial position of the blowtube relative to the die heads, said blowtube extending beyond said cylinder end into connection with said supporting means.

7. The apparatus of claim 3 wherein:

the components named, except for said blowtube, are arranged along a central longitudinal axis and define a passageway concentric thereto which receives said blowtube;

said extruding means comprises a die head for discharging said parison at one axial end thereof;

said means for supporting and moving the spool is an assembly comprising in operably-connected relationship a fluid cylinder, a piston, a piston rod, and an actuator tube carrying said spool, said cylinder being supported in spaced coaxial relation with the die head beyond its other axial end and said piston rod and said actuator tube join in a coupling between said piston and said die head;

said actuator tube is adapted to receive said blowtube and has a slot therein adjacent its junction with said piston rod;

said blowtube has a laterally-extending portion extending outwardly of the actuator tube through said slot from an axially-extending portion within the actuator tube, said slot being of sufficient length to prevent interference of the actuator tube and said laterally-extending portion during axial movements of the actuator tube incident to neck-trimming operations;

said means for supporting the blowtube comprises means for securing said laterally-extending tube portion in fixed relation with said die head.

References Cited
UNITED STATES PATENTS

| | | | |
|---|---|---|---|
| 3,084,383 | 4/1963 | Figna | 18—5 BK X |
| 3,164,646 | 1/1965 | Fischer | 18—5 BA X |
| 3,272,896 | 9/1966 | Winchester | 18—5 BA X |
| 3,314,106 | 4/1967 | Latreille et al. | 18—5 BA |
| 3,457,592 | 7/1969 | Winchester | 18—5 BA |

J. SPENCER OVERHOLSER, Primary Examiner

M. O. SUTTON, Assistant Examiner

U.S. Cl. X.R.

18—DIG 18